(12) United States Patent
Sugizaki

(10) Patent No.: US 7,016,079 B2
(45) Date of Patent: Mar. 21, 2006

(54) METHOD OF AND APPARATUS FOR GENERATING PROOF IMAGE

(75) Inventor: Makoto Sugizaki, Minamiashigara (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 192 days.

(21) Appl. No.: 10/775,100

(22) Filed: Feb. 11, 2004

(65) Prior Publication Data

US 2004/0157144 A1    Aug. 12, 2004

Related U.S. Application Data

(62) Division of application No. 10/136,381, filed on May 2, 2002, now Pat. No. 6,753,119.

(30) Foreign Application Priority Data

May 8, 2001    (JP)    ............................. 2001-136897

(51) Int. Cl.
H04N 1/405    (2006.01)
(52) U.S. Cl. ................. 358/1.9; 358/3.06; 358/3.07
(58) Field of Classification Search ............... 358/1.9, 358/3.06, 3.07, 3.13, 3.14, 3.16–3.2, 534–536; 382/237, 270
See application file for complete search history.

(56) References Cited

U.S. PATENT DOCUMENTS

| 6,204,930 | B1  | 3/2001 | Inoue |
| 6,411,401 | B1* | 6/2002 | Ebner et al. ................. 358/1.9 |
| 6,525,838 | B1* | 2/2003 | Nagae et al. ............... 358/534 |
| 6,771,392 | B1* | 8/2004 | Ebner ........................ 358/3.07 |

* cited by examiner

*Primary Examiner*—Scott A. Rogers
(74) *Attorney, Agent, or Firm*—Sughrue Mion, PLLC

(57) ABSTRACT

A halftone dot threshold data rewriting unit reads halftone dot threshold data corresponding to the output resolution of a printed image generating apparatus which has been set by an output resolution setting unit, from a halftone dot threshold data storage unit, rewrites the read halftone dot threshold data into halftone dot threshold data corresponding to the output resolution of a proof image generating apparatus, and supplies the rewritten halftone dot threshold data to a binary image generator. The binary image generator compares continuous tone image data with the halftone dot threshold data, generates binary image data, and supplies the generated binary image data to an exposure recorder, which generates a proof image corresponding to the output resolution of the printed image generating apparatus.

3 Claims, 6 Drawing Sheets

FIG. 2

| | | | |
|---|---|---|---|
| 6 | 10 | 26 | |
| 22 | 30 | 42 | |
| 54 | 62 | 78 | |
| 94 | 102 | 126 | |

FIG. 3

| 6 | 6 | 10 | 10 | 26 | 26 | |
|---|---|---|---|---|---|---|
| 6 | 6 | 10 | 10 | 26 | 26 | |
| 22 | 22 | 30 | 30 | 42 | 42 | |
| 22 | 22 | 30 | 30 | 42 | 42 | |
| 54 | 54 | 62 | 62 | 78 | 78 | |
| 54 | 54 | 62 | 62 | 78 | 78 | |
| 94 | 94 | 102 | 102 | 126 | 126 | |
| 94 | 94 | 102 | 102 | 126 | 126 | |
| | | | | | | |

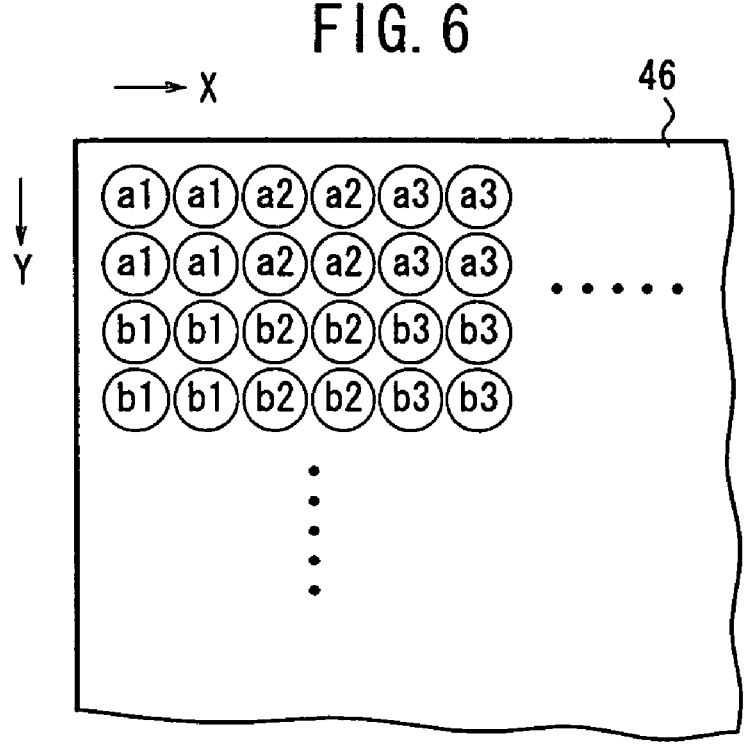

METHOD OF AND APPARATUS FOR GENERATING PROOF IMAGE

This is a divisional of application Ser. No. 10/136,381 filed May 2, 2002; now U.S. Pat. No. 6,753,119 the disclosure of which is incorporated herein by reference.

BACKGROUND OF THE INVENTION

1. Field of the Invention

The present invention relates to a method of and an apparatus for generating a proof image for a printed image before the printed image is produced from an original image by a printed image generating apparatus.

2. Description of the Related Art

In the art of printing and plate making, there have widely been used printed image generating apparatus, or image setters, for electrically processing image information of originals to generate film plates for printing images for the purposes of simplifying the processing steps and improving the image quality. The image formed on a film plate which is generated by an image setter is transferred to a printing plate, which will be used to produce a printed material.

In recent years, there have become available a CTP (Computer To Plate) apparatus capable of directly producing a printing plate from image information without producing a film plate and a CTC (Computer To Cylinder) apparatus capable of producing an image on the plate cylinder of a printing press from image information.

These printed image generating apparatus operate by reading an original image with a scanner to generate continuous tone image data, processing the continuous tone image data as desired, comparing the processed continuous tone image data with threshold data to generate binary image data, and controlling a laser beam or the like according to the binary image data to form an image on a recording medium for printing.

When the original image is converted into a halftone dot image, a periodic nature of the original image interferes with the periodic nature of halftone dots, producing a moire pattern in the outputted printed image and an image structure peculiar to halftone dots, such as a rosette image.

In order to confirm such a moire pattern and an image structure in advance, predict the characteristics of a printed image, and set optimum printing conditions, there has heretofore been used a proof image generating apparatus of simple arrangement for generating a proof image which simulates a printed image.

The proof image generating apparatus sets the same output conditions as the output resolution and screen ruling which have been set by the printed image generating apparatus, and generates a proof image under the set output conditions for predicting and inspecting a printed image. In view of the trends of the printed image generating apparatus toward higher output resolutions, the proof image generating apparatus has output resolutions and screen rulings equivalent to those of the printed image generating apparatus so as to be able to output proof images at the output resolutions of the printed image generating apparatus.

Recently, a technique has been developed which is capable of setting output conditions of a low output resolution and a high screen ruling and outputting a highly fine printed image of high gradations. Specifically, there has been developed a super-cell printed image generating apparatus which provides a small number of gradations that can be expressed by individual halftone dots because the output resolution is low, but can produce a high-gradation image by combining a plurality of halftone dots. The super-cell printed image generating apparatus is capable of outputting an image at an output resolution of 1200 dpi (dots per inch) and a screen ruling of 175 lpi (lines per inch), which has heretofore been outputted at an output resolution of 2400 dpi and a screen ruling of 175 lip. Therefore, the super-cell printed image generating apparatus can output printed images at a high speed.

However, the output conditions of the proof image generating apparatus remain equivalent to those of the printed image generating apparatus. In order to change the output conditions, it is necessary to substantially modify the arrangement of the proof image generating apparatus, and such substantial modifications entail a considerable expenditure of expenses.

SUMMARY OF THE INVENTION

It is a general object of the present invention to provide a method of and an apparatus for generating a proof image in a manner to be highly responsive to changes in the output conditions of a printed image generating apparatus.

A major object of the present invention is to provide a method of and an apparatus for generating a proof image in a manner to be highly responsive to changes in the output resolution of a printed image generating apparatus.

Another object of the present invention is to provide a method of and an apparatus for generating a proof image upon changes in the output conditions of a printed image generating apparatus, using a proof image generating apparatus having different output conditions.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a diagram of halftone dot threshold data used in a printed image generating apparatus;

FIG. 3 is a diagram of halftone dot threshold data generated by rewriting the halftone dot threshold data shown in FIG. 2;

FIG. 6 is a diagram illustrative of a method of generating a proof image with the proof image generating apparatus according to the third embodiment.

DESCRIPTION OF THE PREFERRED EMBODIMENTS

Figure 1:
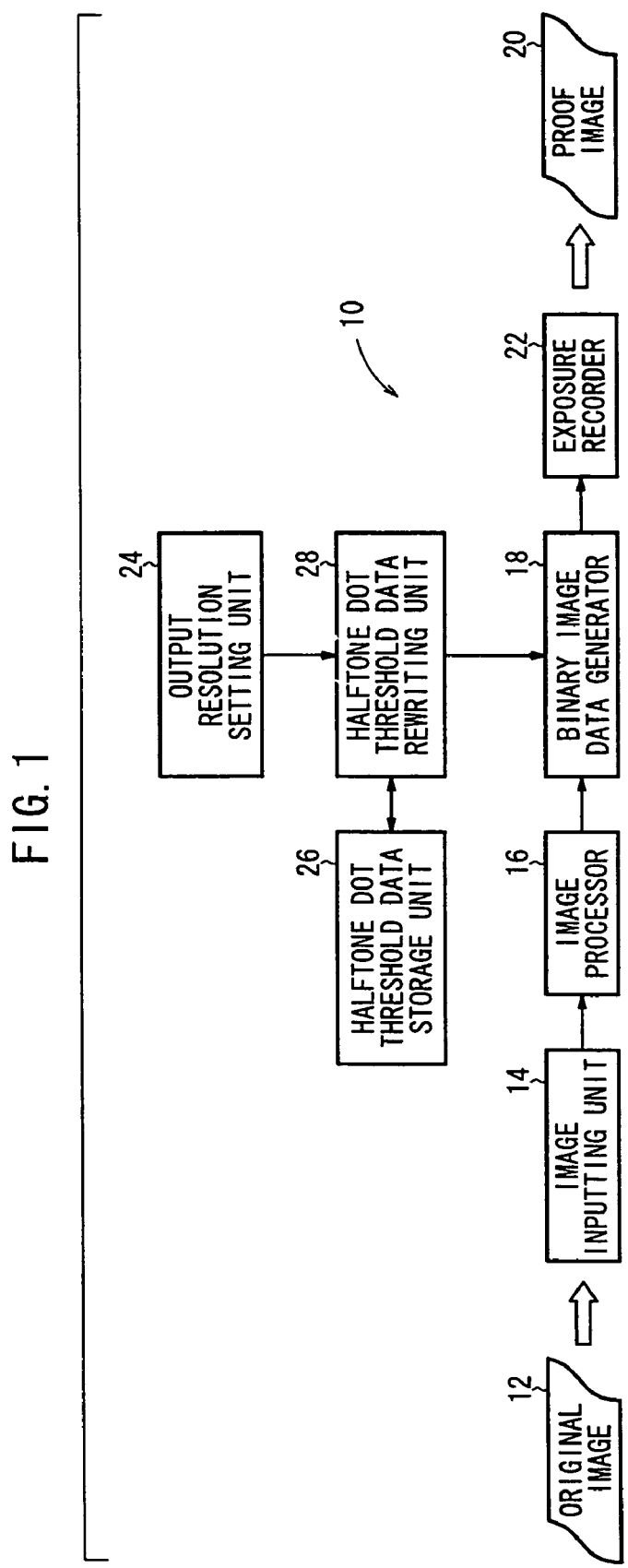
FIG. 1 is a block diagram of a proof image generating apparatus according to a first embodiment of the present invention.

FIG. 1 shows in block form a proof image generating apparatus 10 according to a first embodiment of the present invention. As shown in FIG. 1, the proof image generating apparatus 10 comprises an image input unit 14 for reading an original image 12 and generating continuous tone image data from the original image 12, an image processor 16 for processing the continuous tone image data as desired, a binary image generator 18 for converting the processed continuous tone image data into binary image data using halftone dot threshold data, and an exposure recorder 22 for controlling a laser beam or the like based on the binary image data to record a proof image 20 on a recording medium.

The proof image generating apparatus 10 also comprises an output resolution setting unit 24 for setting an output resolution with r spect to a printed image generating apparatus in order to produce a printed image from the original image 12, a halftone dot threshold data storage unit 26 for storing halftone dot threshold data at the output resolution of the printed image generating apparatus, and a halftone dot threshold data rewriting unit 28 for rewriting the halftone dot threshold data into halftone dot threshold data depending on the output resolution of the proof image generating apparatus 10.

The proof image generating apparatus 10 according to the first embodiment is basically constructed as described above. Operation of the proof image generating apparatus 10 will be described below.

The operator sets the output resolution of the printed image generating apparatus in order to obtain a printed image from the original image 12, in the output resolution setting unit 24. Then, the halftone dot threshold data rewriting unit 28 reads halftone dot threshold data having a desired screen angle and screen ruling and corresponding to the output resolution of the printed image generating apparatus, which has been set by the operator in the output resolution setting unit 24, from the halftone dot threshold data storage unit 26, and rewrites the read halftone dot threshold data into halftone dot threshold data corresponding to the output resolution of the proof image generating apparatus 10.

Figure 2:
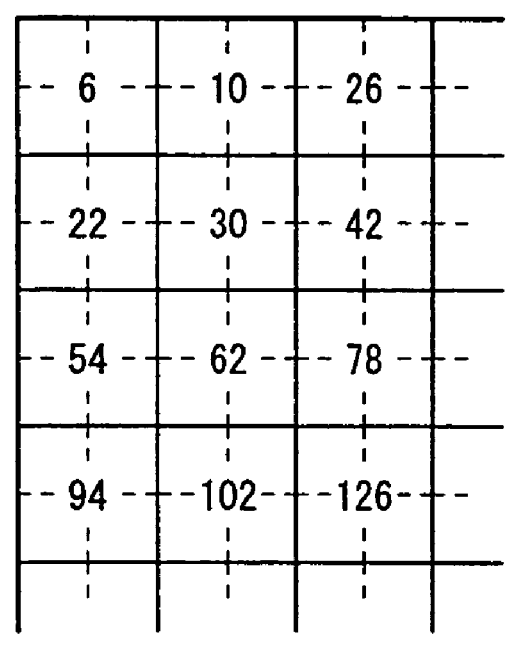

The processing operation of the halftone dot threshold data rewriting unit 28 will be described in detail below with reference to FIGS. 2 and 3. FIG. 2 shows the halftone dot threshold data corresponding to the output resolution of the printed image generating apparatus. FIG. 3 shows the rewritten halftone dot threshold data corresponding to the output resolution of the proof image generating apparatus 10. In this example, the output resolution of the printed image generating apparatus is 1200 dpi, and the output resolution of the proof image generating apparatus 10 is 2400 dpi. Since the output resolution of the printed image generating apparatus which has been set by the operator in the output resolution setting unit 24 is one half of the output resolution of the proof image generating apparatus 10, the halftone dot threshold data rewriting unit 28 interpolates each of the halftone dot threshold data shown in FIG. 2 into bifold data, and generates the bifold data as the halftone dot threshold data shown in FIG. 3.

In FIG. 3, the halftone dot threshold data rewriting unit 28 interpolates each of the halftone dot threshold data by copying an adjacent one of the halftone dot threshold data. However, the halftone dot threshold data rewriting unit 28 may interpolate each of the halftone dot threshold data by determining an average value of adjacent two of the halftone dot threshold data. Specifically, in FIG. 3, the halftone dot threshold data rewriting unit 28 interpolates each of the halftone dot threshold data by copying an adjacent one of the halftone dot threshold data, thereby to rewrite the halftone dot threshold data into halftone dot threshold data 6, 6, 10, 10, 26, 26, . . . . However, the halftone dot threshold data rewriting unit 28 may interpolate each of the halftone dot threshold data by determining an average value of adjacent two of the halftone dot threshold data and placing the average value between the adjacent two of the halftone dot threshold data, thereby to rewrite the halftone dot threshold data into halftone dot threshold data 6, 8, 10, 18, 26, . . . .

Generally, if the output resolution of the printed image generating apparatus is represented by r1 and the output resolution of the proof image generating apparatus 10 by r2, then the halftone dot threshold data rewriting unit 28 interpolates the halftone dot threshold data at a ratio of r2/r1=N times (N is an integer of 2 or greater), thus rewriting the halftone dot threshold data, and outputs the halftone dot threshold data to the binary image data generator 18.

After the above preparatory process is completed, the image input unit 14 reads the original image 12 and supplies the data of the read original image 12 as continuous tone image data to the image processor 16. The image processor 16 processes the supplied continuous tone image data as desired, and then supplies the processed continuous tone image data to the binary image generator 18.

The binary image generator 18 compares the continuous tone image data supplied from the image processor 16 with the rewritten halftone dot threshold data supplied from the halftone dot threshold data rewriting unit 28, and generates binary image data. Specifically, if the continuous tone image data is equal to or greater than the halftone dot threshold data, then the binary image generator 18 replaces the continuous tone image data with "1", and if the continuous tone image data is smaller than the halftone dot threshold data, then the binary image generator 18 replaces the continuous tone image data with "0". The binary image data corresponds to the output resolution of the proof image generating apparatus 10.

The exposure recorder 22 controls a laser beam or the like based on the binary image data supplied from the binary image generator 18, and outputs a proof image 20 at the output resolution of the proof image generating apparatus 10.

While the proof image 20 is produced at the output resolution of the proof image generating apparatus 10, since the halftone dot threshold data has been rewritten depending on the output resolution of the printed image generating apparatus, the proof image 20 is virtually produced at the output resolution of the printed image generating apparatus.

Figure 4:
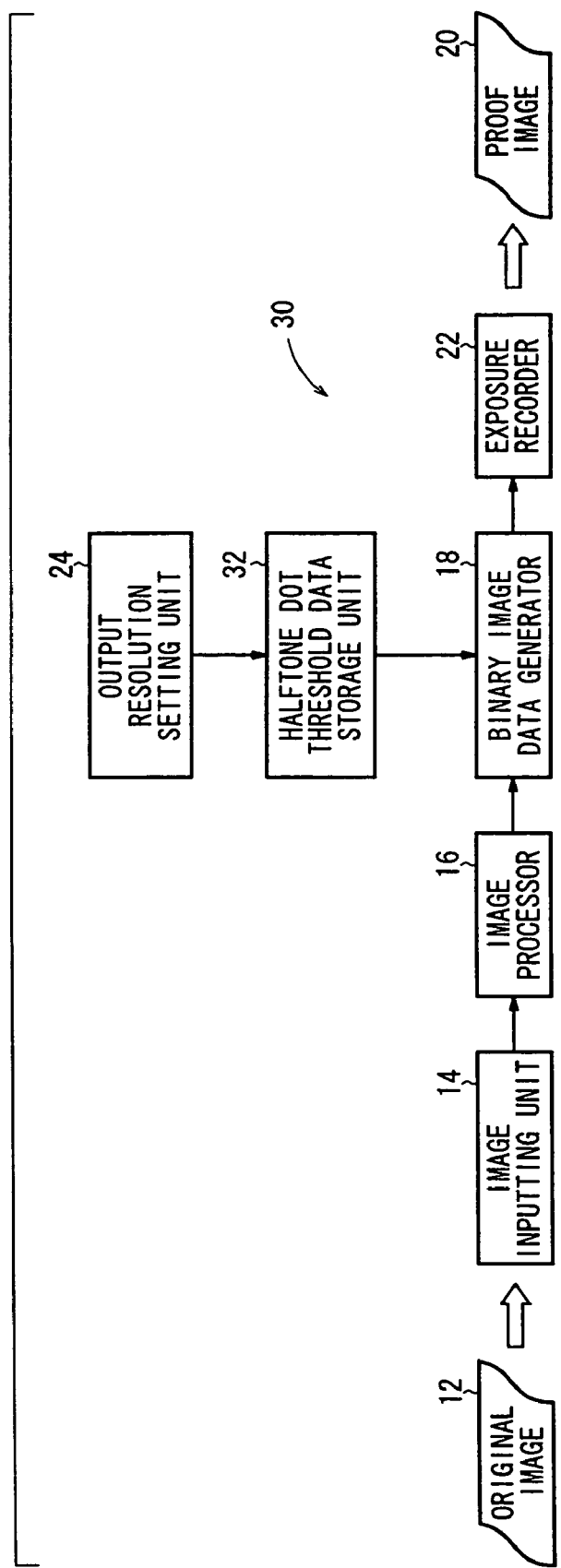
FIG. 4 is a block diagram of a proof image generating apparatus according to a second embodiment of the present invention.

FIG. 4 shows in block form a proof image generating apparatus 30 according to a second embodiment of the present invention. Those parts of the proof image generating apparatus 30 which are identical to those of the proof image generating apparatus 10 according to the first embodiment are denoted by identical reference characters, and will not be described in detail below.

The proof image generating apparatus 30 has a halftone dot threshold data storage unit 32 which stores halftone dot threshold data at the output resolution of the proof image generating apparatus 30 which has been produced by rewriting halftone dot threshold data at the output resolution of the printed image generating apparatus. The halftone dot threshold data can be rewritten in the same manner as the halftone dot threshold data rewritten by the halftone dot threshold data rewriting unit 28 according to the first embodiment.

In operation, the operator sets the output resolution of the printed image generating apparatus in order to obtain a printed image from the original image 12, in the output resolution setting unit 24. Then, the halftone dot threshold data storage unit 32 selects halftone dot threshold data of the proof image generating apparatus 30 corresponding to the output resolution of the printed image generating apparatus, which has been set by the operator in the output resolution setting unit 24. The halftone dot threshold data storage unit 32 supplies the selected halftone threshold data of the proof image generating apparatus 30 to the binary image data generator 18. The binary image data generator 18 generates binary image data, and the exposure recorder 22 generates a proof image 20 in the same manner as with the first embodiment.

The rewritten halftone dot threshold data at the output resolution of the proof image generating apparatus 30 depending upon the output resolution of the printed image generating apparatus is set in the halftone dot threshold data storage unit 32. Therefore, the proof image generating apparatus 30 does not need the time which would otherwise be required to rewrite halftone dot threshold data, and hence can generate the proof image 20 quickly.

Figure 5:
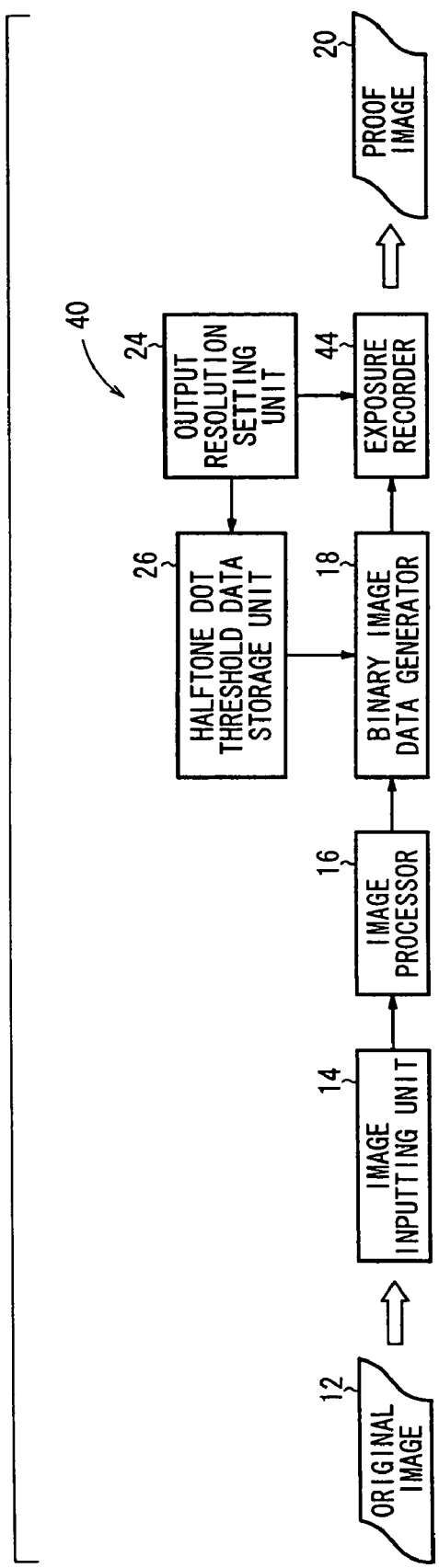
FIG. 5 is a block diagram of a proof image generating apparatus according to a third embodiment of the present invention.

FIG. 5 shows in block form a proof image generating apparatus 40 according to a third embodiment of the present invention. Those parts of the proof image generating apparatus 40 which are identical to those of the proof image generating apparatus 10 according to the first embodiment are denoted by identical reference characters, and will not be described in detail below.

The proof image generating apparatus 40 has a halftone dot threshold data storage unit 26 for storing halftone dot threshold data at the output resolution of the printed image generating apparatus as in the first embodiment. The proof image generating apparatus 40 also has an exposure recorder 44 for interpolating the binary image data depending upon the output resolution of the printed image generating apparatus which has been set in the output resolution setting unit 24 and the output resolution of the proof image generating apparatus 40, thereby generating a proof image 20.

In operation, the operator sets the output resolution of the printed image generating apparatus in order to obtain a printed image from the original image 12, in the output resolution setting unit 24. Then, the halftone dot threshold data storage unit 32 supplies to the binary image data generator 18 halftone dot threshold data corresponding to the output resolution of the printed image generating apparatus which has been set by the operator in the output resolution setting unit 24. The binary image data generator 18 compares the continuous tone image data supplied from the image processor 16 with the halftone dot threshold data supplied from the halftone dot threshold data storage unit 26, and generates binary image data at the output resolution of the printed image generating apparatus. The binary image data generator 18 supplies the generated binary image data to the exposure recorder 44.

The exposure recorder 44 processes the binary image data as shown in FIG. 6, thereby generating a proof image 20. Specifically, the exposure recorder 44 determines a magnification ratio N=r2/r1 (N is an integer of 2 or greater) for the output resolution r2 of the proof image generating apparatus 40 with respect to the output resolution r1 of the printed image generating apparatus which is set by the operator in the output resolution setting unit 24. Then, the exposure recorder 44 interpolates the binary image data into N-fold binary image data according to the magnification ratio N, and records a proof image 20 on a recording medium 46 based on the N-fold binary image data.

FIG. 6 is illustrative of an interpolating process for interpolating the binary image data when the output resolution of the proof image generating apparatus 40 is set twice (N=2) the output resolution of the printed image generating apparatus. According to the interpolating process, the exposure recorder 44 records each of the pixels a1, a2, a3, . . . repeatedly twice in the main scanning direction indicated by the arrow X on the recording medium 46, and records each of the main scanning lines repeatedly twice in the auxiliary scanning direction indicated by the arrow Y on the recording medium 46. As a result, the proof image 20 at an output resolution equivalent to the output resolution of the printed image generating apparatus is recorded on the recording medium 46.

Although certain preferred embodiments of the present invention have been shown and described in detail, it should be understood that various changes and modifications may be made therein without departing from the scope of the appended claims.

What is claimed is:

1. A proof image generating apparatus for generating a proof image for a printed image before the printed image is produced from an original image by a printed image generating apparatus, comprising:
    output resolution setting means for setting an output resolution of the printed image generating apparatus;
    halftone dot threshold data holding means for holding halftone dot threshold data at said output resolution set by said output resolution setting means;
    halftone dot threshold data rewriting means for rewriting the halftone dot threshold data at said set output resolution into halftone dot threshold data at an output resolution of the proof image generating apparatus;
    binary image data converting means for converting continuous tone image data obtained from the original image into binary image data using the rewritten halftone dot threshold data; and
    means for generating the proof image from said binary image data.

2. A proof image generating apparatus for generating a proof image for a printed image before the printed image is produced from an original image by a printed image generating apparatus, comprising:
    output resolution setting means for setting an output resolution of the printed image generating apparatus;
    halftone dot threshold data holding means for holding halftone dot threshold data at an output resolution of the proof image generating apparatus which has been produced by rewriting halftone dot threshold data at the output resolution of the printed image generating apparatus;
    binary image data converting means for selecting the halftone dot threshold data corresponding to the output resolution set by said output resolution setting means, and converting continuous tone image data obtained from the original image into binary image data using the selected halftone dot threshold data; and
    means for generating the proof image from said binary image data.

3. A proof image generating apparatus for generating a proof image for a printed image before the printed image is produced from an original image by a printed image generating apparatus, comprising:
    output resolution setting means for setting an output resolution of the printed image generating apparatus;
    halftone dot threshold data holding means for holding halftone dot threshold data at said output resolution set by said output resolution setting means;
    binary image data converting means for converting continuous tone image data obtained from the original image into binary image data using the halftone dot threshold data at said output resolution set by said output resolution setting means;
    interpolating means for interpolating said binary image data depending on the output resolution of the proof image generating apparatus; and means for generating the proof image from said binary image data.

* * * * *